United States Patent
Irie et al.

[11] Patent Number: 5,862,210
[45] Date of Patent: Jan. 19, 1999

[54] SIGNAL DETECTION CIRCUIT AND TELEPHONE APPARATUS

[75] Inventors: Kenji Irie; Yoshihiro Nakamura, both of Kanagawa, Japan

[73] Assignee: Sony Corporation, Tokyo, Japan

[21] Appl. No.: 802,912

[22] Filed: Feb. 20, 1997

[30] Foreign Application Priority Data

Feb. 27, 1996 [JP] Japan .................................. 8-065262

[51] Int. Cl.⁶ ................................................... H04M 3/42
[52] U.S. Cl. .................... 379/215; 379/93.35; 379/163; 379/283; 379/386
[58] Field of Search .......................... 379/93.35, 179, 379/215, 386, 156, 162, 163, 283, 350, 372, 399

[56] References Cited

U.S. PATENT DOCUMENTS 5,263,084  11/1993  Chaput et al. ............................ 379/215
5,519,774   5/1996  Battista et al. .......................... 379/386
5,649,002   7/1997  Brady et al. ............................. 379/142

*Primary Examiner*—Fan S. Tsang
*Assistant Examiner*—Shih-Wen Hsieh
*Attorney, Agent, or Firm*—Jay H. Maioli

[57] ABSTRACT

A signal detection circuit includes band pass filters for detecting frequency components of a Call Alert signal (CAS) signal, a tone detection circuit for detecting whether or not a signal component is present in the output signals of the band pass filters, and two types of guard time setting circuits that have different guard times. When the CAS signal component is present, a transmitting speech signal is muted. Thereafter, with the guard time setting circuit having the normal guard time, it is determined whether or not the signal component lasts for a predetermined time period. Since the CAS signal is detected with two types of guard times, even if the transmitting speech signal contains a frequency component of the CAS signal, the transmitting speech signal is not mis-detected as the CAS signal.

6 Claims, 4 Drawing Sheets

SIGNAL DETECTION CIRCUIT AND TELEPHONE APPARATUS

BACKGROUND OF THE INVENTION

1. Field of the Invention

The present invention relates to a telephone apparatus that allows the user to use a caller ID service informing him or her of the telephone number and the name of the calling party and a signal detection circuit for use therewith.

2. Description of the Related Art

In the North American countries, a caller ID service that informs the user of the telephone number and the name of the calling party has been used. In such a caller ID service, when a telephone terminal receives a call, the service informs the user of the telephone number and the name of the calling party. As a modification to the above conventional service, a new type of service has been proposed. In this new service, while a first user is communicating with a second user, if a third user calls the first user, the service informs the first user of the telephone number and the name of the third user who is call-waiting. In other words, when the first user does not know who is the third user, the first user does not know whether or not the third user is superior to the second user. When the first user receives a call waiting signal, however, and if the first user is informed who is the third user, the first user can conveniently determine to whom the first user should talk.

Such a new type caller ID service can be accomplished in the following manner.

While the first user is communicating with the second user, if the third user calls the first user, the telephone exchange sends a dual tone signal referred to as CAS (Call Alert Signal) to the telephone of the first user so as to mute the receiving speech signal. Responding to the CAS signal, the telephone of the first user sends a DTMF signal that represents "D" so as to receive information from the third user. When the telephone exchange has received the "D" signal of the DTMF signal from the telephone terminal of the first user, the telephone exchange sends data of the telephone number and the name of the third user as FSK (Frequency Shift Keying) modulated data. The telephone terminal of the first user demodulates the FSK-modulated data, decodes the data of the telephone number and the name of the third user, and displays the decoded data on the display of the telephone terminal.

In the new type caller ID service corresponding to the call-waiting signal, before the telephone exchange sends the telephone number and the name of the third user, it sends the CAS signal that causes the telephone terminal of the first user to mute the receiving speech signal. The CAS signal is a dual tone signal with frequencies of 2130 Hz and 2750 Hz. The CAS signal lasts for 80 msec. The telephone terminal that accomplishes the new type caller ID service corresponding to the call-waiting signal has a signal detection circuit that detects the dual tone signal with frequencies 2130 Hz and 2750 Hz.

Generally, as shown in FIG. 1, the signal detection circuit that detects such a dual tone signal comprises a frequency band limiting filter 102, a band pass filter 103 that extracts a frequency component of 2130 Hz, a band pass filter 104 that extracts a frequency component of 2750 Hz, a tone detection circuit 105 that detects whether or not the component of the tone signal is present, and a guard time setting circuit 106 that determines whether or not a component of the tone signal is continuously detected for a predetermined guard time that is shorter than the time period of the CAS signal.

In the new type caller ID service corresponding to the call-waiting signal, the CAS signal that is a dual tone signal with frequencies of 2130 Hz and 2750 Hz is supplied from the telephone exchange to an input terminal 101. When the CAS signal is received, the band pass filter 103 extracts a frequency component of 2130 Hz. The band pass filter 104 extracts a frequency component of 2750 Hz. The extracted frequency components are supplied to the tone detection circuit 105. When the tone detection circuit 105 detects these frequency components of the tone signal, it outputs a detection signal. Since the CAS signal lasts for 80 msec, the guard time setting circuit 106 detects the tone signal for a time period more than a predetermined guard time which is shorter than the time period of the CAS signal. A detection signal that represents the dual tone signal is outputted from an output terminal 107.

A transmitting speech signal and a receiving speech signal flow on a telephone line. Not only a signal sent from the telephone exchange, but a transmitting speech signal of the telephone terminal are supplied to the input terminal 101. The transmitting speech signal may contain a component of the tone signal by chance. When the detection signal contains frequency components of 2130 Hz and 2750 Hz and the transmitting speech signal lasts for the predetermined guard time, although the transmitting speech signal is not the dual tone signal of the CAS signal, the detection signal that represents that the tone signal is present is fed to the output terminal 107. In particular, speech signals of some users may have spectrum peaks at frequencies 2130 Hz and 2750 Hz by chance. When such users send calls, mis-detections may frequently take place.

To prevent such mis-detections, the guard time may be set to 30 msec or more. However, in the case that the guard time is set to 30 msec or more, since a transmitting speech signal is present while the dual tone signal is being detected, the sound level of the transmitting speech signal may exceed the sound level of the dual tone signal during the guard time. Thus, frequently, the signal detection is adversely affected. In the case that the guard time is set to around 5 msec, since the dual tone signal can be detected in a no-sound period between words, the probability that the signal detection is adversely affected becomes high. Moreover, as described, the probability that a component of the speech signal is detected as the dual tone signal becomes high.

OBJECT AND SUMMARY OF THE INVENTION

Thus, an object of the present invention is to provide a telephone apparatus that allows a first user to use a caller ID service corresponding to a call-waiting signal and a signal detection circuit whereby the first user can receive information about the third user when the first user is communicating with the second user.

The present invention is a signal detection circuit for determining whether a multi-frequency signal exists during a predetermined period on a signal line on which a transmitting speech signal and a receiving speech signal are carried comprising a frequency detection means for detecting the multi-frequency signal on the signal line to produce a detection signal, a speech network being controllable to mute the transmitting speech signal to be provided to the signal line, and a determination means for controlling the speech network to mute the transmitting speech signal in response to the detection signal from the frequency detection means and then determining whether the multi-frequency signal has been present during the predetermined period by monitoring the detection signal.

Since a signal with a predetermined frequency is detected with two types of guard times, before data of the telephone number and the name of a calling party is sent, even if a transmitting speech signal contains the same signal component as the CAS signal, misdetection does not take place.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
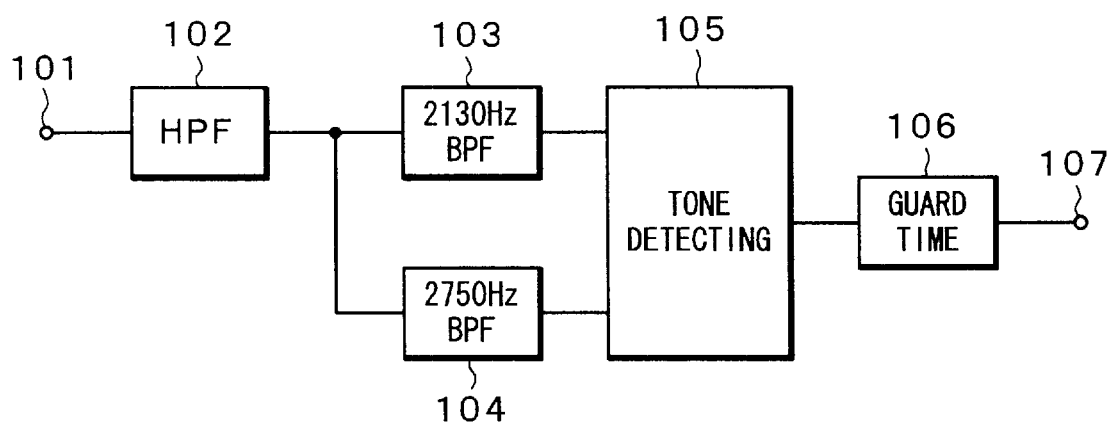
FIG. 1 is a block diagram showing an example of a conventional signal detection circuit.
Figure 2:
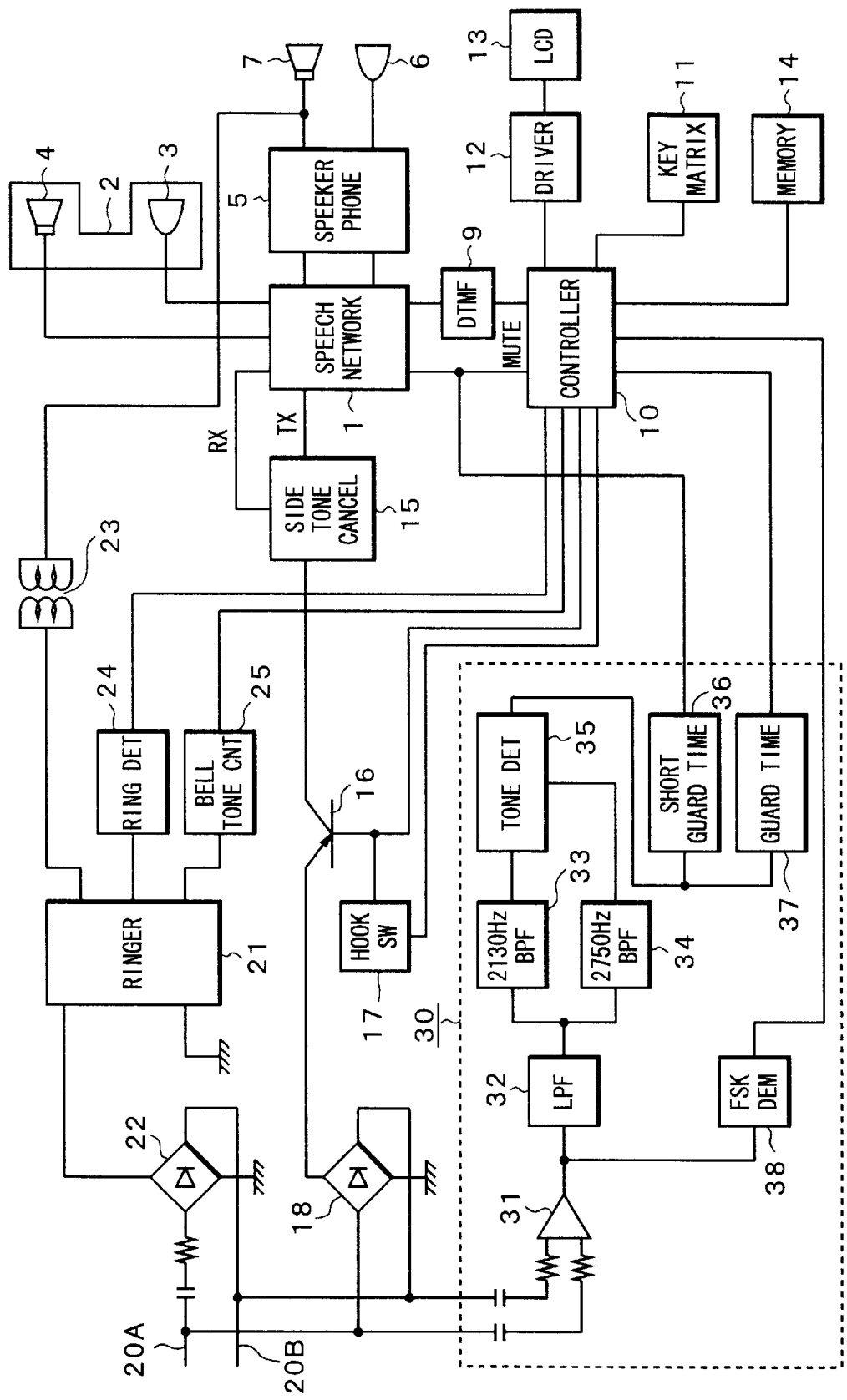
FIG. 2 is a block diagram showing an example of a telephone terminal according to the present invention.

Next, with reference to the accompanying drawings, embodiments of the present invention will be described. FIG. 2 shows an example of a telephone terminal according to the present invention. In FIG. 2, reference numeral 1 is a speech network. A handset 2 is connected to the speech network 1. The handset 2 has a microphone 3 and a speaker 4. When the user uses the telephone terminal, an output signal of the speech network 1 is supplied to the speaker 4 of the handset 2. A speech signal of the remote party is outputted from the speaker 4. In addition, the speech signal of the user is inputted to the microphone 3 of the handset 2 and supplied to the speech network 1.

In addition, the speech network 1 is connected to a speaker phone circuit 5. A microphone 6 and a speaker 7 are connected to the speaker phone circuit 5. An output signal of the speech network 5 is supplied to the speaker 7 through the speaker phone circuit 5. An output signal of the microphone 6 is supplied to the speech network 1 through the speaker phone circuit 5.

Reference numeral 10 is a controller that controls the entire telephone terminal. An output signal of a key matrix 11 is supplied to the controller 10. Responding to the output signal of the key matrix 11, a DTMF generating circuit 9 generates a DTMF signal. The input signal corresponds to a control signal supplied from a controller 10. The DTMF signal is supplied to the speech network 1. The controller 10 is connected to the speech network 1. The controller 10 mutes a speech signal.

An output signal of the controller 10 is supplied to a liquid crystal display 13 through a liquid crystal driver 12. The controller 10 causes a data storage memory 14 to write and read data.

A side tone protecting circuit 15 and an off-hook/on-hook switch transistor 16 are disposed upstream of the speech network 1. The side tone protecting circuit 15 cancels a side tone. The switch transistor 16 connects or disconnects the telephone line. The switch transistor 16 is turned on/off by a hook switch 17. When the transistor 16 is turned on, lines 20A and 20B of the telephone line and the speech network 1 are connected through a bridge circuit 18, the transistor 16, and the side tone protecting circuit 15 so as to communicate with the calling party.

Reference numeral 21 is a ringer that rings a receiving bell. When a call is sent, a calling signal is sent through the telephone lines 20A and 20B. This signal is supplied to the ringer 21 through a bridge circuit 22. An output signal of the ringer 21 is supplied to the speaker 7 through an isolating transformer 23. Thus, a receiving bell sound is generated by the speaker 7. In addition, the output signal of the ringer 21 is supplied to a ring detection circuit 24. A detection signal of the ring detection circuit 24 is supplied to the controller 10. Thus, the controller 10 is informed that the call has been received. Moreover, a bell controller 25 is activated. The bell controller 25 controls the tone of the receiving bell corresponding to information of the remote party.

Reference numeral 30 is a signal detecting/demodulating circuit. The telephone terminal according to the present invention can use the caller ID service corresponding to the call-waiting signal. The signal detecting/demodulating circuit 30 has a signal detection circuit and a FSK demodulating circuit 38. The signal detection circuit detects the CAS signal that is a dual tone signal containing frequency components of 2130 Hz and 2750 Hz that cause the receiving speech signal to be muted. The FSK demodulating circuit 38 demodulates data of the name, telephone number, and so forth of the calling party that has been modulated. The signal detection circuit, which detects the CAS signal, is composed of a low pass filter 32 that limits a frequency band, a band pass filter 33 that passes a frequency component of 2130 Hz, a band pass filter 34 that passes a frequency component of 2750 Hz, a tone detection circuit 35, and two guard time setting circuits 36 and 37.

A signal received through the telephone lines 20A and 20B is supplied to the band pass filters 33 and 34 through the amplifier 31 and the low pass filter 32. The band pass filter 33 extracts a frequency component of 2130 Hz. The band pass filter 34 extracts a frequency component of 2750 Hz. Output signals of the band pass filters 33 and 34 are supplied to the tone detection circuit 35. The tone detection circuit 35 detects whether or not the components of the dual tone signal are present in the output signals of the band pass filters 33 and 34. An output signal of the tone detection circuit 35 is supplied to the two guard time setting circuits 36 and 37.

The guard time setting circuit 36 sets a guard time for a short time period (for example, 5 msec). When the output signal of the tone detection circuit 35 lasts for 5 msec, the guard time setting circuit 36 generates an output signal. The output signal of the guard time setting circuit 36 is supplied to a mute terminal of the speech network 1. Responding to the output signal of the guard time setting circuit 36, the transmitting speech signal of the speech network 1 is set to the mute state for a predetermined time period (for example, 35 msec). The other guard time setting circuit 37 sets a guard time that is longer than the guard time setting circuit 36. In this case, when the output signal of the tone detection circuit 35 lasts for 35 msec, the guard time setting circuit 37 supplies the output signal to the controller 10.

The telephone terminal according to the present invention has two such guard time setting circuits 36 and 37. Thus, the telephone terminal can prevent the CAS signal from being mis-detected.

In the caller ID service corresponding to the call-waiting signal, before the information about the calling party is sent, the CAS signal, which is a dual tone signal containing frequency components of 2130 Hz and 2750 Hz, is sent through the telephone lines 20A and 20B. At this point, in addition to the CAS signal, a speech signal of the calling party is supplied to the signal detecting/demodulating circuit 30 through the microphone 3 (or 6), the speech network 1, the side tone protecting circuit 15, the transistor 16, and the bridge circuit 18. Thus, when the speech signal of the calling party contains signal components of 2130 Hz and 2750 Hz, the telephone terminal may mis-detect the speech signal of the calling party as the CAS signal.

To solve this problem, in the telephone terminal according to the present invention, when the guard time setting circuit 36 detects signal components of 2130 Hz and 2750 Hz in a short guard time, it supplies a mute signal to the speech network 1 and mutes the transmitting speech signal. While the transmitting speech signal of the speech network 1 is being muted, when the guard time setting circuit 37 detects the frequency components of 2130 Hz and 2750 Hz for a predetermined guard time (for example, 35 msec), the controller 10 determines that the CAS signal has been received from the telephone exchange.

Thus, the CAS signal can be correctly detected. In other words, when the CAS signal, which is the dual tone signal containing frequency components of 2130 Hz and 2750 Hz, is sent through the telephone lines 20A and 20B, the transmitting speech signal of the speech network 1 is in a muted state due to the detection signal supplied from the guard time setting circuit 36. Thus, the guard time setting circuit 37 detects the CAS signal and the controller 10 determines that the CAS signal is present. On the other hand, in the case that the CAS signal has not been sent and the speech signal of the calling party contains the frequency components of 2130 Hz and 2750 Hz, the guard time setting circuit 36 outputs the detection signal corresponding to the output signal of the tone detection circuit 35. However, since the transmitting speech signal of the speech network 1 has been muted, the speech signal is not supplied to the signal detecting/demodulating circuit 30. Thereafter, the guard time setting circuit 37 does not output the detection signal and thereby the controller 10 determines that the CAS signal has not been received.

When the controller 10 has determined that the CAS signal has been received, the controller 10 mutes the receiving speech signal and sends a DTMF signal that represents "D" so as to receive information about the calling party supplied from the telephone exchange. When the telephone exchange receives the DTMF signal representing "D" from the telephone terminal, the telephone exchange sends data of the telephone number and name of the calling party to the telephone terminal.

Figure 3:
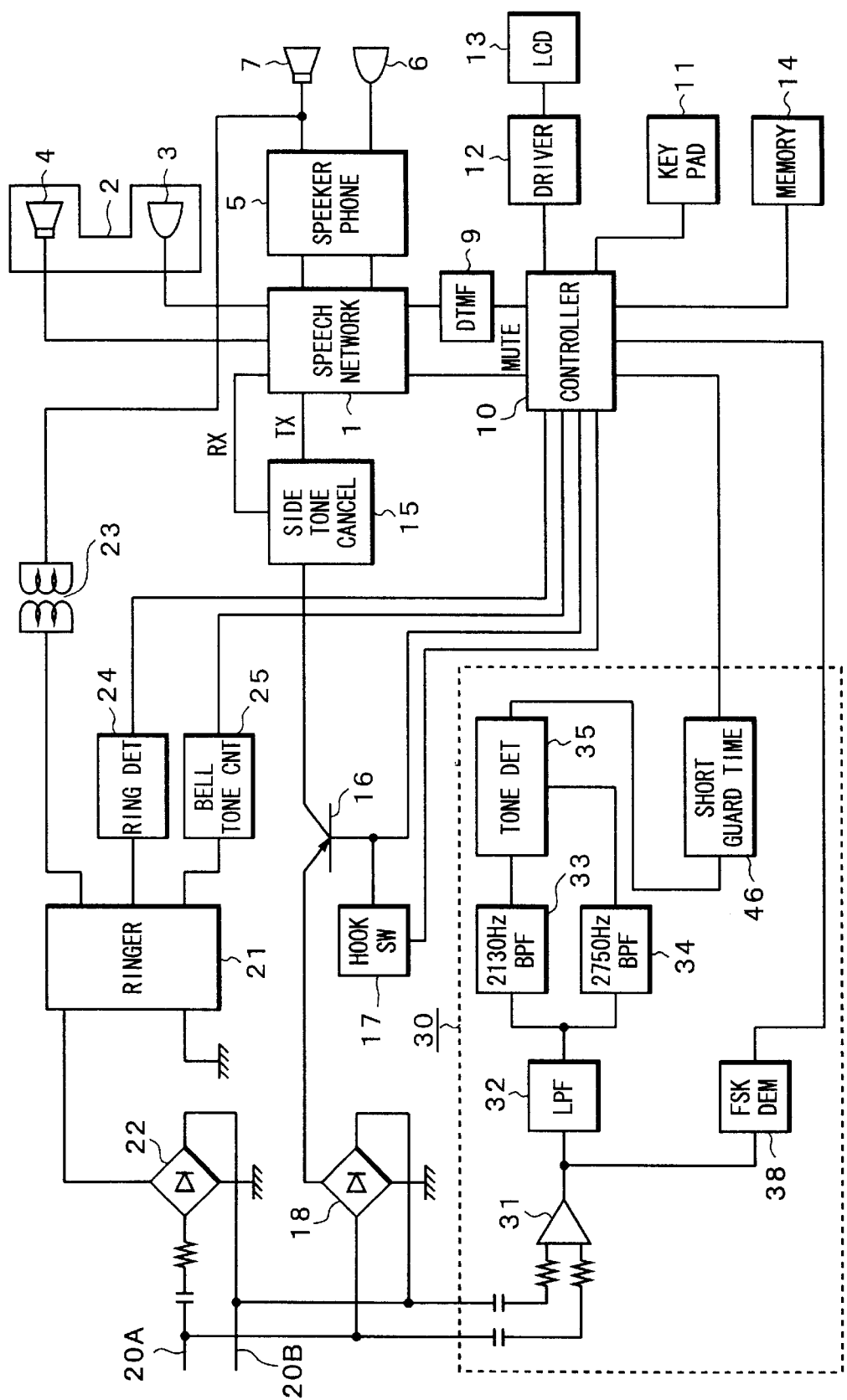
FIG. 3 is a block diagram showing another example of the telephone terminal according to the present invention.

FIG. 3 is a block diagram showing another example of the telephone terminal according to the present invention. In the example, shown in FIG. 2, the signal detecting/demodulating circuit 30 has two guard time setting circuits with different guard times so as to prevent the CAS signal from being mis-detected. On the other hand, in the example shown in FIG. 3, there is one guard time setting circuit 46 and the same effect as the example shown in FIG. 2 can be obtained. Since the other circuitry in FIG. 3 is similar to the example shown in FIG. 2, its description is omitted.

Figure 4:
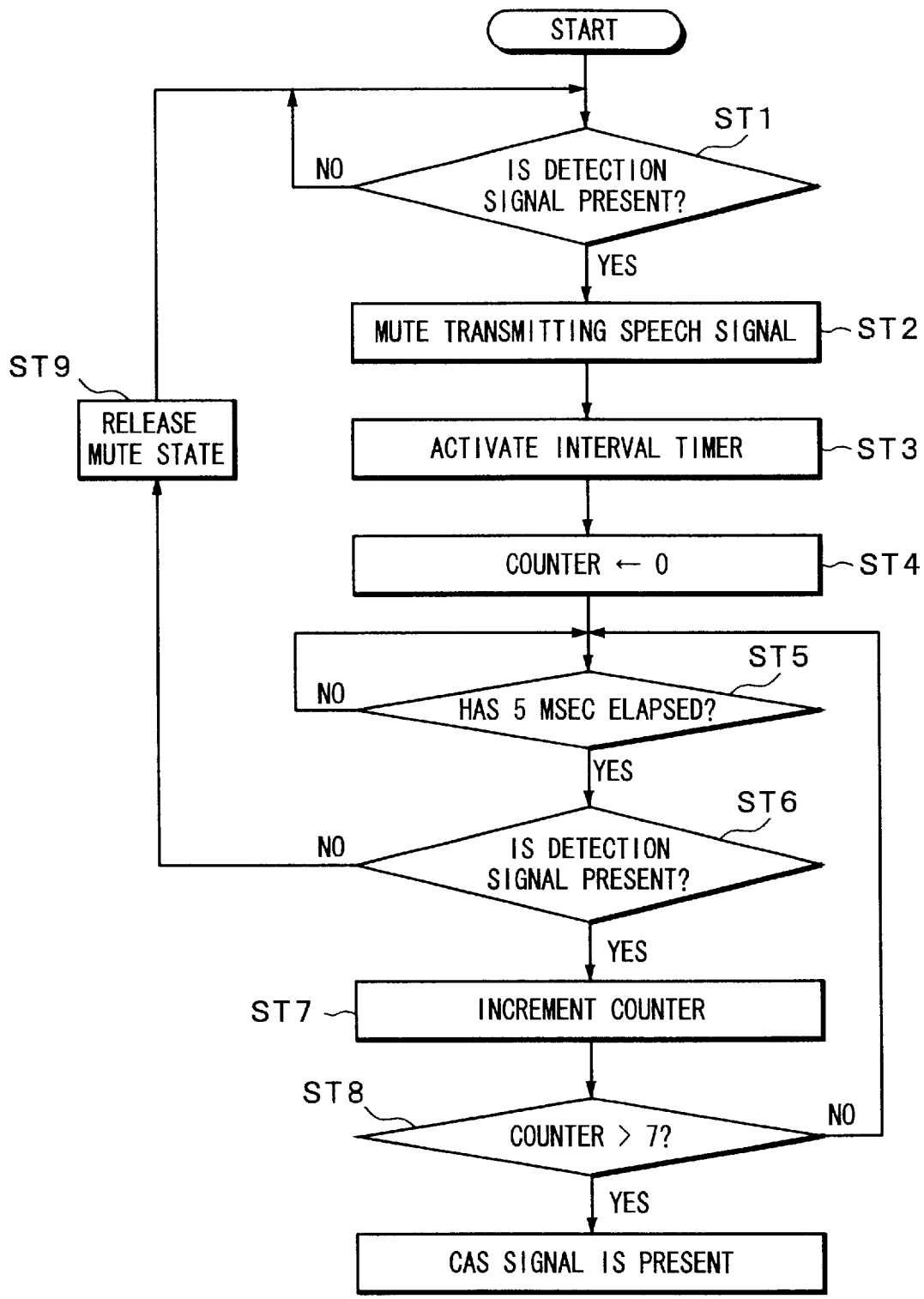
FIG. 4 is a flow chart for explaining another example of the telephone terminal according to the present invention.

The guard time setting circuit 46 sets a short guard time (for example, 5 msec). When the output signal of the tone detection circuit 35 lasts for 5 msec, the guard time setting circuit 46 generates a detection signal. The detection signal of the guard time setting circuit 46 is supplied to a controller 10. With the detection signal of the guard time setting circuit 46, the controller 10 performs a process as shown in FIG. 4 so as to determine whether or not the CAS signal has been detected.

When the detection signal of the guard time setting circuit 46 is present (at step ST1), the controller 10 mutes the transmitting speech signal of the speech network 1 (at step ST2). In addition, the controller 10 activates for example a 5-msec interval timer (not shown) (at step ST3) and resets an internal counter to "0" (not shown) that counts the number of interval times (at step ST4). The controller 10 determines whether or not an interval time of 5 msec has elapsed (at step ST5). When the interval has elapsed, the controller 10 determines whether or not the detection signal of the guard time setting circuit 46 is present (at step ST6). When the detection signal of the guard time setting circuit 46 is present, the controller 10 increments the counter value (at step ST7). The controller 10 determines whether the counter value has become for example "7" (at step ST8). When the counter value has not become for example "7", the flow returns to step ST5. In the next interval of 5 msec, the controller 10 determines whether or not the detection signal is present corresponding to the output signal of the guard time setting circuit 46. When the signal is not present at step ST6, the controller 10 releases the mute state of the transmitting speech signal (at step ST9). Thereafter, the flow returns to step ST1. When the counter value has become for example "7", the controller 10 outputs the detection result that represents that the CAS signal is present (at step ST10).

In this example, the transmitting speech signal of the speech network 1 is intermittently muted every 5 msec. While the transmitting speech signal is being muted, it is determined whether or not the detection signal is present. When the state of which the detection signal is present intermittently continues seven times every 5 msec, it is determined that the state of which the signal is present lasts for 35 msec or more.

According to the present invention, with two types of guard times, which are a short guard time and a normal guard time, before data of the telephone number, name, and so forth of the calling party is sent, the CAS signal is detected. In other words, when a frequency component of the CAS signal is detected in the short guard time, after the transmitting speech signal of the speech network is muted, it is determined whether or not a signal component of the CAS signal has been detected. Thus, even if the transmitting speech signal contains a component that is the same as a frequency component of the CAS signal, the component of the transmitting speech signal is not mis-detected as a component of the CAS signal.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A signal detection circuit for determining whether a multi-frequency signal exists for a predetermined period on a signal line on which a transmitting speech signal and a receiving speech signal are carried, the signal detection circuit comprising:

frequency detection means for detecting the multi-frequency signal on the signal line and for producing a detection signal;

a controllable speech network for muting the transmitting speech signal carried by the signal line;

a first guard time setting circuit for producing an output signal when the detection signal from the frequency detection means exists for a first period, the first period being shorter than the predetermined period;

determination means for controlling the controllable speech network for muting the transmitting speech signal in response to the output from the first guard time setting circuit; and a second guard time setting circuit for producing an output signal when the detection signal from the frequency detection means exists for the predetermined period while the transmitting speech signal is muted.

2. The signal detection circuit as set forth in claim 1, wherein comprises:

repeating means for repeating the muting operation of the controllable speech network in response to the output of the first guard time setting circuit while the output signal from the first guard time setting circuit exists; and a counter for counting a predetermined number of repetitions and for determining whether the multi-frequency signal has been present during the predetermined period, the predetermined period being equal to the predetermined number of repetitions multiplied by the first period.

3. The signal detection circuit as set forth in claim 1, wherein said frequency detection means comprises a plurality of filter circuits for passing individual frequency signals of the multi-frequency signal and a tone detection circuit for producing the detection signal after receiving output signals from said plurality of filter circuits.

4. A telephone apparatus usable for a call-waiting service in which a telephone number of a calling party is transmitted to said telephone apparatus from a central office, said telephone apparatus having a transmitting and receiving speech circuit, a signal detection circuit for determining whether a first multi-frequency signal exists for a predetermined period on a signal line on which a transmitting speech signal and a receiving speech signal are carried, and a signal generation circuit for generating a second multi-frequency signal that is transmitted to said central office when said signal detection circuit determines that the first multi-frequency signal exists for the predetermined period, said signal detection circuit comprising:

frequency detection means for detecting the first multi-frequency signal on the signal line and for producing a detection signal;

a controllable speech network for muting the transmitting speech signal carried by the signal line;

a first guard time setting circuit for producing an output signal when the detection signal from the frequency detection means exists for a first period, the first period being shorter than the predetermined period;

determination means for controlling said controllable speech network for muting the transmitting speech signal in response to the output from the first guard time setting circuit; and a second guard time setting circuit for producing an output signal when the detection signal from the frequency detection means exists for the predetermined period while the transmitting speech signal is muted.

5. The telephone apparatus as set forth in claim 4, wherein the second guard time setting circuit comprises repeating means for repeating the muting operation of the determining means a predetermined number of times while the output signal from said first guard time circuit exists, the predetermined period being equal to the first period multiplied by the predetermined number of times.

6. The telephone apparatus as set forth in claim 4, wherein said frequency detection means comprises a plurality of filter circuits for passing individual frequency signals of the multi-frequency signal and a tone detection circuit for producing the detection signal after receiving output signals from said plurality of filter circuits.

* * * * *